United States Patent [19]
Yoshimine et al.

[11] 3,852,161
[45] Dec. 3, 1974

[54] DISTILLATION OF PENTACHLOROPHENOL

[75] Inventors: Masao Yoshimine; Erwin H. Kobel, both of Midland, Mich.

[73] Assignee: The Dow Chemical Company, Midland, Mich.

[22] Filed: July 5, 1973

[21] Appl. No.: 376,756

[52] U.S. Cl............... 203/6, 203/38, 203/57, 203/53, 203/91, 203/92, 260/600, 260/623 R, 260/623 H
[51] Int. Cl.......................... B01d 3/34, C07c 39/36
[58] Field of Search........... 203/6, 8, 38, 29, 54, 62, 203/96, 91, 92; 260/623 R, 600, 623 H

[56] References Cited
UNITED STATES PATENTS
2,190,607   2/1940   Perkins .............................. 260/600
2,662,918   12/1953  Spaulding ........................ 260/623 H
3,769,353   10/1973  Francis et al. ................... 260/623 H
3,770,835   11/1973  Garabedian..................... 260/623 R FOREIGN PATENTS OR APPLICATIONS
1,246,529   9/1971   Great Britain .................. 260/623 R OTHER PUBLICATIONS
Biltz et al., Berichte 37, 4017, 4018 (1904).

Primary Examiner—Wilbur L. Bascomb, Jr.
Attorney, Agent, or Firm—David T. Thurston

[57] ABSTRACT

Purified pentachlorophenol is recovered in good yield by distilling the commercially available grade under reduced pressure in the presence of distillation residues from the Reimer-Tiemann preparation of salicylaldehyde. Preferably water is also added to the material to be distilled. The purified product is nearly colorless and nonblooming and it is essentially free of polychlorinated dibenzo-p-dioxins and phenoxyphenols.

3 Claims, No Drawings

DISTILLATION OF PENTACHLOROPHENOL

BACKGROUND OF THE INVENTION

This invention relates to an improved method whereby pentachlorophenol can be purified by large scale distillation with high recovery and minimal decomposition and side reactions. A product which is essentially free of undesirable impurities and unsatisfactory physical properties is thereby obtained using ordinary plant distillation equipment.

Pentachlorophenol is a well known and widely used fungicide and preservative which is particularly useful for preserving wood exposed to attack by the elements. Commercially available pentachlorophenol in the past has been a relatively dark colored solid sold in the form of flakes and prills or beads. This material has an annoying characteristic of blooming or subliming to form a surface layer of easily dislodged fine cyrstalline dust which is intensely irritating to skin and mucous membranes. The dark color is caused by high molecular weight tarry impurities and is of itself no particular disadvantage for many uses such as the protection from rot of posts and poles designed for sinking in the ground. However, the color is disadvantageous for other uses, for example wood used in outdoor furniture, porches, and decks. Of perhaps more serious consequence is the recent discovery of the toxic properties of polychlorinated dibenzo-p-dioxins which fortunately constitute a relatively small proportion of the high molecular weight impurities. It has also been found that other polychlorinated polynuclear impurities, the chlorinated phenoxyphenols, are a primary cause of blooming of impure pentachlorophenol.

Impurities such as these can be removed by recrystallization, but this process is usually too expensive and slow for use with a bulk chemical. An obvious means for getting rid of high boiling impurities is distillation and pentachlorophenol has been distilled to purify it, see Biltz, et al., Berichte 37, 4018 (1904). However, pentachlorophenol is not completely stable at elevated temperatures and it tends to decompose and undergo side reactions to some extent during distillation to form large volumes of HCl and tar, particularly in the presence of the small amounts of aluminum and iron chlorides present in most commercially available material. Exposure of the material to water deactivates these metal chlorides but an undesirable degree of decomposition and side reaction persists at distillation temperatures. It is known that small amounts of salicylaldehyde stabilize pentachlorophenol at elevated temperatures, see British Pat. No. 1,246,529, but even in its presence, an undesirable amount of decomposition continues in the prolonged heating necessary for distillation. It is also known that such decomposition is inhibited by a combination of salicylaldehyde and water. However, this combination is not fully effective when the distillation vessel has exposed surfaces of iron, nickel, or stainless steel. Therefore, ordinary plant distillation equipment cannot be used and a glass or glass lined distillation pot must be employed.

SUMMARY OF THE INVENTION

It has now been found that pentachlorophenol is stabilized and decomposition during distillation even in the presence of a ferrous or nickeliferous metal is effectively inhibited by the presence of about 0.05–3 percent by weight based on the pentachlorophenol of salicylaldehyde process distillation residue remaining from the Reimer-Tiemann reaction of phenol and chloroform. The pentachlorophenol distillation is carried out at subatmospheric pressure, preferably below about 100 mm Hg.

DETAILED DESCRIPTION

The Reimer-Tiemann reaction has been used for many years to make salicylaldehyde on a commercial scale. As conventionally used, the process comprises reacting phenol with about an equivalent amount or a moderate excess of chloroform in the presence of a substantial molar excess of sodium hydroxide, for example, about 3–4 moles of NaOH per mole of chloroform. Ordinarily, aqueous sodium hydroxide is employed and the reaction is run at moderate temperatures between about 50°C. and the boiling point of the reaction mixture. After the reaction is essentially completed, the mixture is acidified by addition of a strong mineral acid, sulfuric or hydrochloric acid being commonly used, and the resulting oil layer is distilled, usually steam distilled, to separate the salicylaldehyde product. It is the residue remaining from this distillation which is the inhibitor used in the present invention to enable practical distillation of pentachlorophenol when there is a ferrous or nickeliferous metal surface in the distillation pot.

As ordinarily used in the invention, some water is present in the distillation residue inhibitor and the water provides some additional benefit although it is not necessary to successful operation of the distillation. Preferably, however, some water is added to the crude pentachlorophenol prior to or during the distillation, either as a component of the Reimer-Tiemann process tar or as water separately added in any of several convenient ways. Liquid water may be added or the pentachlorophenol may be contacted with steam. Even contact of the pentachlorophenol with moist air is effective.

A suitable proportion of salicylaldehyde process tar is about 0.05–3 percent by weight and preferably about 0.1–1.5 percent. These figures represent practical limits rather than critical amounts, for any significant amount provides some stabilizing effect. Larger amounts actually begin to show a deleterious effect. At least about 0.01 percent of water is preferred and about 0.05–0.5 percent is most preferred. Larger quantities can be used but give little or no added benefit.

For reasons of convenience and avoidance of significant decomposition even in the presence of the stabilizing combination, the distillation is carried out at subatmospheric pressure, preferably below 100 mm Hg. absolute, and most preferably at an absolute pressure sufficiently low to keep the distillation head temperature below about 230°C., i.e., a pressure below about 80 mm Hg., but sufficiently high to avoid freezing of the pentachlorophenol in the head.

The distilled product is typically a light yellow crystalline solid having little or no tendency to bloom. When it is converted to a granular form such as flakes or beads, it remains free flowing and essentially unchanged in appearance even after long storage.

EXAMPLES 1–8

An aqueous solution of one molar equivalent of phenol and 7.5 equivalents of NaOH was heated to about 65°C. and 1.9 equivalents of chloroform was added at that temperature according to the procedure for the preparation of salicylaldehyde described on page 672 of Vogel, A Textbook of Practical Organic Chemistry (Longmans, Green and Co., 1948). The reacted mixture was steam distilled to remove unreacted chloroform, acidified with dilute sulfuric acid, and steam distilled again to separate the salicylaldehyde product essentially as described by Vogel. The distillation residue was washed twice with water and used as a distillation stabilizer as described below. Analysis of the residue showed 19.4% water, 13.8% p-hydroxybenzaldehyde, less than 0.1% each of phenol and salicylaldehyde, and the remainder was high boiling byproducts and tars not further identified.

A mixture of 500 g. technical grade pentachlorophenol prills with 2 g. of this distillation residue was distilled from a distillation flask containing nickel and 316 stainless steel column packing and powdered iron to provide 132 sq. in. Ni surface 13.2 sq. in. stainless steel, and 1.32 sq. in. Fe at 75 mm Hg. absolute pressure through a 1 inch × 7 inch distillation column packed with 316 stainless steel column packing plus a small amount of iron packing to provide 2.9 sq. in. iron surface in the column in about one hour of distillation time to a final pot temperature of about 270°C. The pentachlorophenol had been made by chlorination of chlorophenols in the presence of aluminum chloride. The residue remaining in the distillation pot was then held at the final pot temperature for an additional four hours to simulate recycling of tars through a heat exchanger in a commercial distillation unit. The HCl evolved during the distillation and during the hold period was monitored by scrubbing the vent gas through a known quantity of 1N NaOH and titrating with 1N HCl.

Additional pentachlorophenol distillations were run as described above using the same grade of pentachlorophenol and other Reimer-Tiemann salicylaldehyde process distillation residues of closely similar composition. The residue used in Examples 2–6 contained about 15% water, about 5% p-hydroxybenzaldehyde, 2–3% phenol, and 1–2% salicylaldehyde with highers and tar constituting the remainder. The residue used in Example 7 was the same material dried to 2% water content. That used in Example 8 was from an incompletely distilled reaction mixture and it contained 33.7% water, 10.3% p-hydroxybenzaldehyde, 7.3% phenol, and 1.3% salicylaldehyde. The results of these experiments are listed in Table1. The distillates were light yellow and typically contained about 90–95 percent pentachlorophenol with the remainder consisting essentially of tetrachlorophenol. Only trace amounts if any of polychlorinated phenoxyphenol and polychlorodibenzo-p-dioxin were present.

TABLE 1

| Example No. | Additive | Wt. % Recovery Distillate | Residue | Millimoles HCl Evolved During Distillation | At 270–300°C. |
|---|---|---|---|---|---|
| 1 | 0.4% SAT[1] | 92.8 | 6.8 | 2.0 | 2.2 |
| 2 | 0.4% SAT | 93.5 | 6.1 | 3.7 | 20 |
| 3 | 0.4% SAT + 0.6% added H₂O | 92.3 | 6.6 | 3.2 | 11.6 |
| 4 | 0.4% SAT + 1.2% added H₂O | 93.5 | 5.8 | 1.6 | 6.0 |
| 5 | 0.6% SAT | 93.1 | 6.1 | 3.2 | 11.6 |
| 6 | 1.2% SAT | 92.3 | 6.6 | 38.1 | 24.7 |
| 7 | 0.4% SATD[2] | 90.7 | 8.2 | 1.7 | 32 |
| 8 | 0.4% SATW[3] | 93.8 | 5.7 | 1.8 | 14.6 |

[1]SAT = Salicylaldehyde process tar containing about 15–19% H₂O.
[2]SATD = Salicylaldehyde process tar dried to about 2% H₂O content.
[3]SATW = Salicylaldehyde process tar containing about 34% H₂O.

EXAMPLES 9–10

The procedure of Example 1 was repeated with the exceptions that a small amount of water was added to the pentachlorophenol-salicylaldehyde process tar mixture and the distillation flask contained somewhat different combinations of metal surfaces. In Example 9, the flask contained nickel column packing and powdered iron sufficient to provide 132 sq. in. Ni and 13.2 sq. in. Fe whereas in Example 10 the same two metals were present but with only 1.32 sq. in. Fe surface and nickel as before. These results are listed in Table 2 along with the results of comparative experiments run under similar conditions but outside the limits of the invention in one or more respects.

TABLE 2

| Example No. | Additive | Wt. % Recovery Distillate | Residue | Millimoles HCl Evolved During Distillation | At 270–300°C. |
|---|---|---|---|---|---|
| 9 | 0.4% SAT + 0.07% added H₂O | 94 | 5.6 | 1.5 | 13.2 |
| 10 | 0.4% SAT + 0.07% added H₂O | 94.2 | 5.3 | 6.7 | 24 |
| A[1] | None | 77.2 | 19.9 | 225 | 62 |
| B[1] | 0.4% salicylaldehyde + 0.07% added H₂O | 82.1 | 15.7 | 138.5 | 43 |
| C[2] | 0.4% salicylaldehyde + 0.07% added H₂O | 92.4 | 7.4 | 0.2 | 1.7 |

[1]Metal surfaces present in the distillation flask as in Example 9.
[2]No metal surfaces in distillation flask.

Comparative Example A shows the poor material recovery and relatively large amounts of HCl formed by decomposition when technical grade pentachlorophenol is distilled with no stabilizing additive present. Examples B and C show respectively the lessened protection afforded by the known salicylaldehyde stabilizer plus water when nickel and ferrous surfaces are present in the distillation flask as compared to the effective protection these additives provide in an all glass apparatus.

We claim:

1. A process for purifying impure pentachlorophenol which comprises distilling said pentachlorophenol at subatmospheric pressure from its mixture with about 0.05–3 percent based on the weight of pentachlorophenol of the distillation residue remaining from the Reimer-Tiemann preparation of salicylaldehyde wherein said distillation residue is that obtained by heating a reaction mixture of phenol with at least about an equivalent amount of chloroform and aqueous sodium hydroxide in substantial molar excess over the chloroform at about 50°C. to the boiling point of said reaction mixture until the reaction is substantially complete, acidifying the resulting reaction mixture with a strong mineral acid, thereby forming an oil layer, and distilling said oil layer until substantially all of the product salicylaldehyde has been separated by distillation from the thereby formed distillation residue.

2. The process of claim 1 wherein water is also present in the pentachlorophenol-salicylaldehyde preparation residue mixture.

3. The process of claim 2 wherein the pentachlorophenol distillation pressure is below 100 mm Hg-absolute.

* * * * *